(12) United States Patent
Vilhauer et al.

(10) Patent No.: US 10,263,450 B2
(45) Date of Patent: Apr. 16, 2019

(54) POWER REGULATION IN WIRELESS CHARGING

(71) Applicant: Intel IP Corporation, Santa Clara, CA (US)

(72) Inventors: Reed D. Vilhauer, Portland, OR (US); Shahar Porat, Geva Carmel (IL); Yuval Elad, Petach-Tikva (IL)

(73) Assignee: Intel IP Corporation, Santa Clara, CA (US)

( * ) Notice: Subject to any disclaimer, the term of this patent is extended or adjusted under 35 U.S.C. 154(b) by 456 days.

(21) Appl. No.: 14/711,100

(22) Filed: May 13, 2015

(65) Prior Publication Data

US 2016/0336782 A1    Nov. 17, 2016

(51) Int. Cl.
  *H02J 7/00* (2006.01)
  *H02J 7/02* (2016.01)
  *H04B 5/00* (2006.01)
  *H02J 50/12* (2016.01)

(52) U.S. Cl.
  CPC ............ *H02J 7/025* (2013.01); *H02J 7/0072* (2013.01); *H02J 50/12* (2016.02); *H04B 5/0037* (2013.01)

(58) Field of Classification Search
  USPC ................. 320/107, 108, 114, 137
  See application file for complete search history.

(56) References Cited

U.S. PATENT DOCUMENTS

| | | | | |
|---|---|---|---|---|
| 5,710,506 A | * | 1/1998 | Broell | H02J 7/0073 320/145 |
| 7,528,574 B1 | * | 5/2009 | Adkins | H01M 10/44 320/128 |
| 2005/0088141 A1 | * | 4/2005 | Lee | A45F 5/00 320/114 |
| 2007/0188134 A1 | * | 8/2007 | Hussain | H01M 10/44 320/114 |
| 2010/0277003 A1 | * | 11/2010 | Von Novak | H02J 17/00 307/104 |
| 2013/0147279 A1 | * | 6/2013 | Muratov | H02J 5/005 307/104 |
| 2013/0221905 A1 | * | 8/2013 | Holloway | H02J 7/0054 320/107 |
| 2014/0152251 A1 | * | 6/2014 | Kim | H02J 7/025 320/108 |
| 2014/0159508 A1 | * | 6/2014 | Sankar | H02J 17/00 307/149 |
| 2014/0159653 A1 | * | 6/2014 | Von Novak | H04B 5/0031 320/108 |
| 2015/0042274 A1 | * | 2/2015 | Kim | H02J 7/06 320/108 |

(Continued)

FOREIGN PATENT DOCUMENTS

| | | |
|---|---|---|
| JP | 2010119251 A | 5/2010 |
| WO | 2014093160 A1 | 6/2014 |
| WO | 2015041129 A1 | 3/2015 |

*Primary Examiner* — Brian Ngo
(74) *Attorney, Agent, or Firm* — International IP Law Group, P.L.L.C.

(57) ABSTRACT

Techniques for power regulation in a system, method, and apparatus are described herein. An apparatus for voltage regulation in a wireless power receiver may include a power switch to selectively supply a regulated voltage to a battery at a regulated current. The apparatus may also include load modulation logic to generate load modulation signaling by toggling the power switch.

25 Claims, 5 Drawing Sheets

(56) References Cited

U.S. PATENT DOCUMENTS

| | | | | |
|---|---|---|---|---|
| 2015/0372493 A1* | 12/2015 | Sankar | ................... | H02J 5/005 307/104 |
| 2015/0380971 A1* | 12/2015 | Priev | ...................... | H02J 7/025 320/108 |
| 2017/0098957 A1* | 4/2017 | Sankar | ................... | H02J 50/10 |

* cited by examiner

POWER REGULATION IN WIRELESS CHARGING

TECHNICAL FIELD

This disclosure relates generally to techniques for wireless charging. Specifically, this disclosure relates to regulation of power in wireless power systems.

BACKGROUND ART

A basic wireless charging system may include a wireless power transmitter unit (PTU) and a wireless power receiving unit (PRU). For example, a PTU may include a transmit (Tx) coil, and a PRU may include receive (Rx) coil. Magnetic resonance wireless charging may employ a magnetic coupling between the Tx coil and the Rx coil. In some cases, voltage received may vary causing issues with in initialization of wireless charging systems. In some cases, variations of voltage may violate wireless charging standard specifications.

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

The present disclosure relates generally to techniques for wireless charging. Specifically, the techniques described herein include an apparatus in a wireless power receiving unit (PRU) having a power switch and load modulation logic. As discussed above, voltage variations may generate inefficiencies in wireless charging as well as violations to standards specifications. More specifically, spatial freedom of placement of a device under charge having a receiver (Rx) coil may result in a potentially large rectified receiver voltage (Vrect) variation. Variations in Vrect may result in large variations of rectified power (Prect).

Load modulation logic, as referred to herein, includes one or more electric circuit components, modules, or integrated components configured to generate load modulation signaling via toggling a power switch. A power switch may include one or more electric circuit components, modules, or integrated components configured to selectively supply regulated voltage to a battery at a regulated current. In some cases, the power switch may be power path switch wherein voltage is selectively supplied between a battery of a device and a system load. In some cases, selectively providing a voltage may include concurrently providing voltage to both battery and system load. In some cases, Vrect may be received by a battery charger circuit, such as a battery charger integrated circuit (IC). The battery charger circuit may regulate Vrect and provide the Vrect to the power switch which is configured to supply regulated voltage to the battery and/or the system load at a regulated current. Therefore, because regulated voltage at a regulated current, toggling the power switch may generate load modulation signaling to a wireless power transmitting unit (PTU) inductively coupled to the PRU.

The techniques discussed herein may also reduce power loss that may otherwise occur if load modulation was performed via a resistor. More specifically, rather than dissipating power in a resistor which effectively throws away energy, the techniques described herein harness the energy by charging the battery.

As discussed in more detail below, load modulation via toggling of the power switch may be performed during initialization phases of a device under charge. For example, a computing device having a PRU is placed on a charging pad having a PTU. The PRU may need to broadcast wireless data associated with a wireless handshake with the PTU to properly configure the PTU based on charging capabilities of the PRU and the PTU. If the computing device, such as a mobile computing device, is turned off or includes a dead battery, a time period associated with broadcasting the wireless handshake data may be too short. Therefore, in the techniques described herein, the load modulation generated by toggling the power switch may request and generate an extension in the time period associated with performing the wireless handshake.

In some cases, the techniques discussed herein may be implemented using a wireless charging standard protocol, such as the specification provided by Alliance For Wireless Power (A4WP) version 1.3, Nov. 5, 2014. A wireless power receiving (Rx) coil may be a component in a power receiving unit (PRU), while a wireless power transmission (Tx) coil may be a component in a power transmitting unit (PTU), as discussed in more detail below. However, the techniques described herein may be implemented using any other wireless charging standard protocol where applicable.

Figure 1:
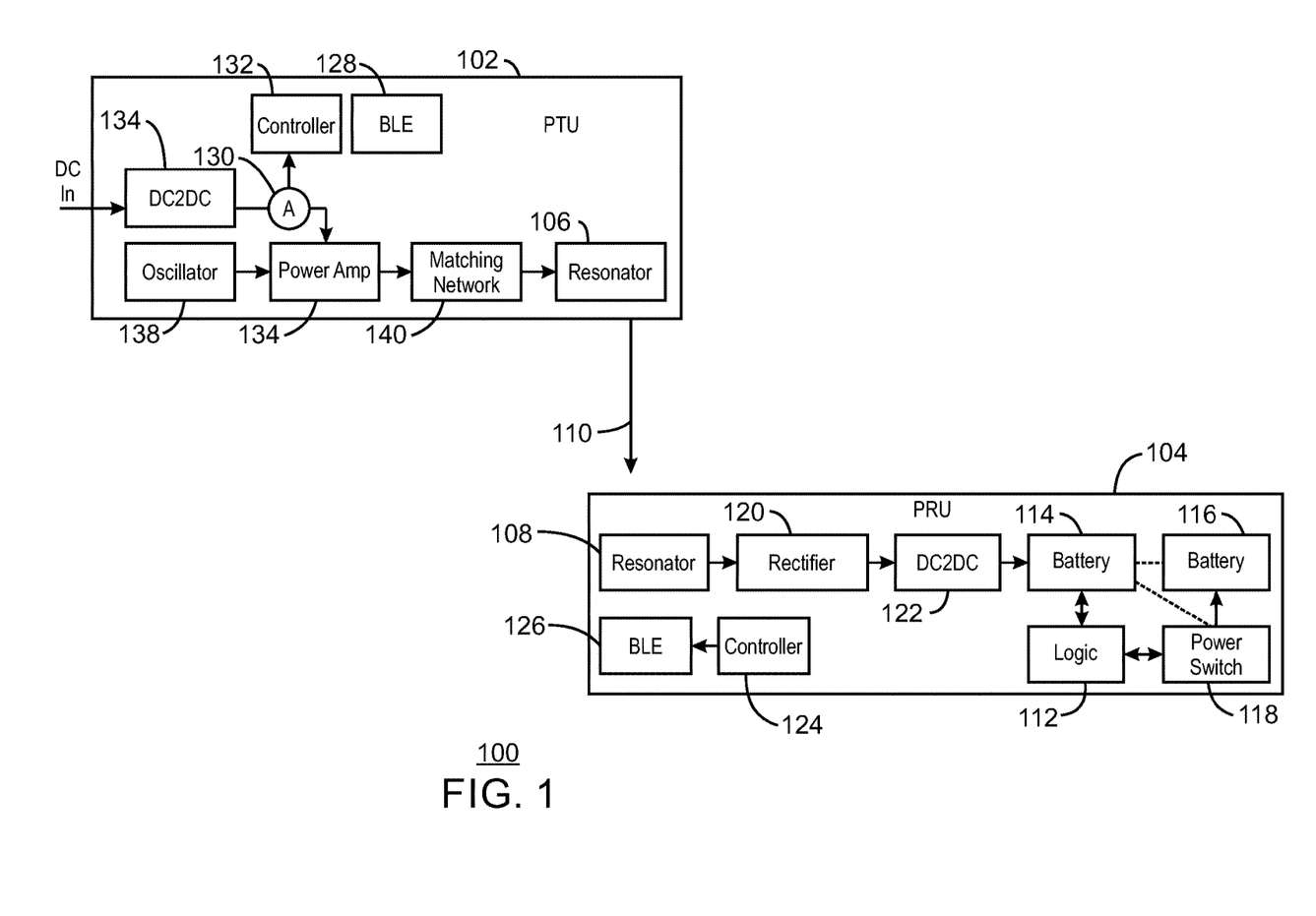
FIG. 1 is block diagram of a PTU to provide power to a PRU, wherein the PRU includes logic configured to induce variations in power within a limited range for load modulation.

FIG. 1 is block diagram of a PTU to provide power to a PRU, wherein the PRU includes logic configured to induce variations in power within a limited range for load modulation. A PTU 102 may couple to a PRU 104 via magnetic inductive coupling between resonators 106, and 108, as indicated by the arrow 110. The resonator 106 may be referred to herein as a Tx coil 106 of the PTU 102. The resonator 108 may be referred to herein as an Rx coil 108 of the PRU 104.

As illustrated in FIG. 1, the PRU 104 may include logic 112. The logic 112 may be referred to herein as load modulation logic 112. The load modulation logic 112 may be configured as an integrated component of a battery charger, such as a battery charger IC 114, as a separate component of the battery charger IC, of any other component of the PRU 104, or any combination thereof. In any case, the load modulation logic 112 may be configured to induce variations in power provided to a battery 116 via a power switch 118 within a limited range during the load modulation. In other words, the load modulation logic 112 may be configured to induce variations in rectified and regulated voltage received from the battery IC 114 to the limited range during load modulation. Since the voltage is regulated and predefined based on characteristics of the battery IC 114 and the PRU 104 at large, the load modulation logic 112 may toggle the power switch 118 at a predefined current.

The load modulation logic 112 may be composed of one or more components, such as electronic circuit components, as discussed in more detail below in regard to FIG. 2. For example, the load modulation logic 112 may be implemented as state machine, combinatorial logic, or any combination thereof. Further, as discussed in more detail below in regard to FIG. 3, the load modulation may be carried out during an initialization stage in order to extend a time period allotted for completing the wireless handshake. Additional details are discussed in more detail below in regard to FIG. 2, as well as throughout the present description, Figures, and claims.

In FIG. 1, inductive coupling may occur between the Tx coil 106 and the Rx coil 108. The rectifier 120 may receive voltage having an alternating current (AC) from the Rx coil 108 and may be configured to generate Vrect in a direct current (DC). As illustrated in FIG. 1, a DC2DC converter 122 provides a DC output to the battery IC 114, the load modulation logic 112 the power switch 118, the battery 116, as well as system load discussed in more detail below. However, in some cases, the DC2DC converter 122 may be implemented as a component of the battery charger IC 114 eliminating one buck stage and potential inefficiency that may otherwise occur if the DC2DC converter 122 were implemented as a discrete component as illustrated in FIG. 1.

The PRU 104 may also include a controller 124 configured to initiate a wireless broadcast having wireless handshake data. The wireless handshake broadcast may be carried out by a wireless data transmission component such as a Bluetooth Low Energy (BLE) module 126. In some cases, the wireless data transmission component may be integrated as operations of the controller 124, a load modulation circuit 112, a direct current to direct current (DC2DC) converter 122, or any combination thereof, wherein the data transmission may be indicated by patterns in the load modulation.

The PTU 102 may include a BLE module 128 configured to communicate with the BLE module 126. The PTU 102 may also include a current sensor 130, a controller 132, a power amplifier 134, a DC2DC converter 134, an oscillator 138, and a matching network 140. The current sensor 130 may be an ampere meter, a volt meter, or any other sensor configured to sense load variations occurring due to inductive coupling between the PTU 102 and another object, such as the PRU 104. The current sensor 130 may provide an indication of load change to the controller 132 of the PTU 102. The controller 132 may power on the power amplifier 134 configured to receive direct current (DC) from the DC2DC converter 134, and to amplify and oscillate the current. An oscillator 138 may oscillate the power provided at a given frequency and a matching network 140 may be used to match the amplified oscillation provided to the resonator 106 of the PTU 102.

The block diagram of FIG. 1 is not intended to indicate that the PTU 102 and/or the PRU 104 are to include all of the components shown in FIG. 1. Further, the PTU 102 and/or the PRU 104 may include any number of additional components not shown in FIG. 1, depending on the details of the specific implementation.

Figure 2:
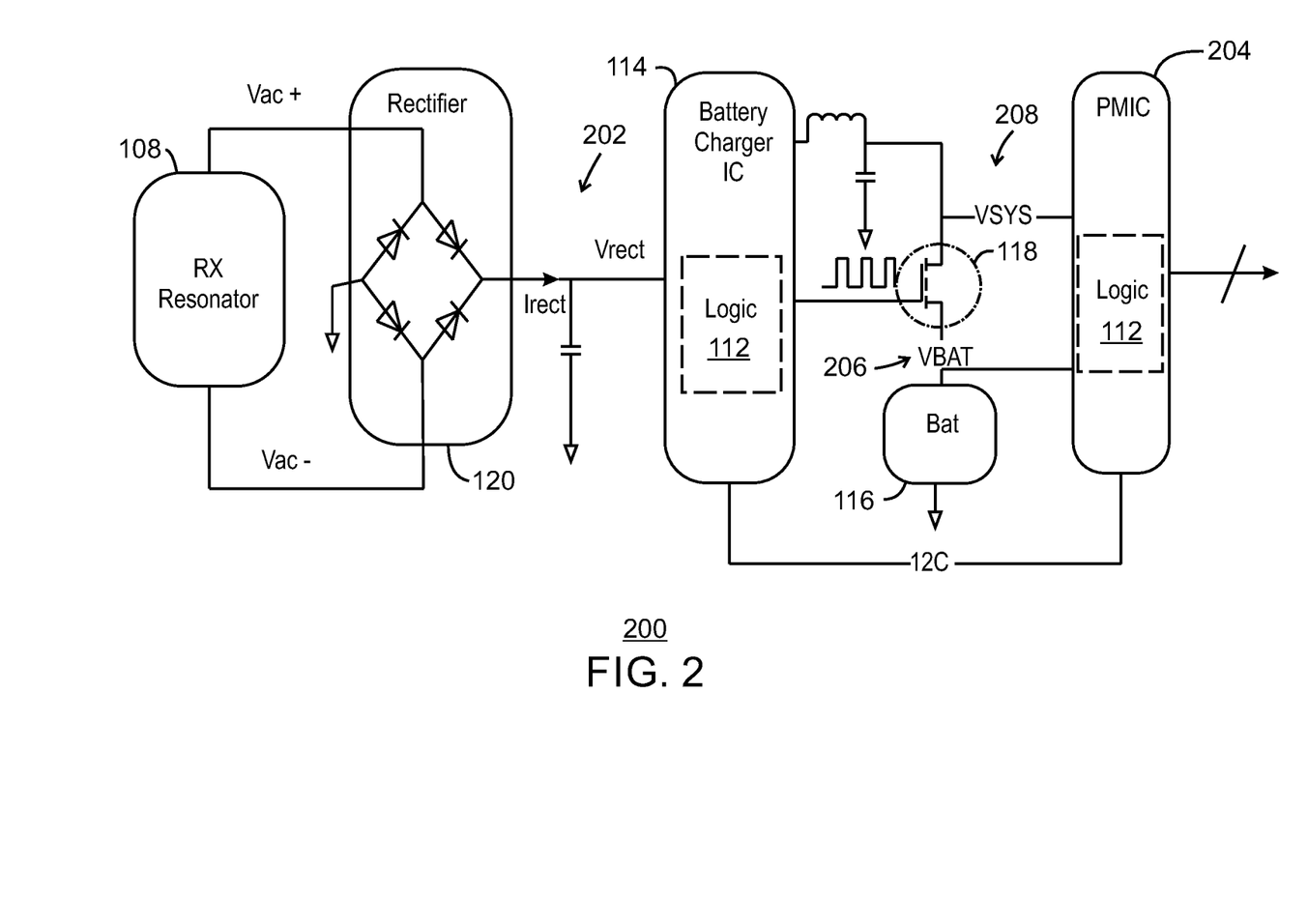
FIG. 2 is an illustration of logic configured to regulate power in load modulation signaling.

FIG. 2 is an illustration of logic configured to regulate power in load modulation signaling. As discussed above, a PRU, such as the PRU 104 of FIG. 1, may be used to charge a computing device 200. The PRU may include the Rx coil 108, the rectifier 120, the battery charger IC 114, the power switch 118, and a battery 116. As indicated at 202, Vrect may be supplied to the battery charger IC 114. The load modulation logic 112 may be disposed in either the battery charger IC 114, a power management IC (PMIC) 204, elsewhere in the computing device 200, or any combination thereof. The logic may control the power switch 118 by toggling the power switch 118. Toggling of the power switch 118 may generate load modulation to extend a beacon period associated with wireless handshake operations. As indicated in FIG. 2, the load modulation logic 112 may toggle the power switch 118 without losing power that may otherwise occur if toggling were to be performed at a resistor (not shown) that would lose power via a grounded connection. Further, toggling the power switch 118 may be done without using an additional component in power path systems including a power switch such as the power switch 118. Power path systems may, in general, include the power switch 118 to provide regulated voltage to the battery 206 (VBAT) and the system load voltage 208 (VSYS) via the PMIC 204.

Further, rather than attempting to perform load modulations on Vrect before voltage regulation at the battery charger IC 114, the techniques described herein enable load modulation to be performed within a predefined range as both the voltage and current at the power switch 118 are regulated and known. For example, in A4WP, load modulation to extend a time period associated with wireless handshake completion may be required to be between 0.5 Watts (W) and 1.1. W. Having regulated, and therefore known within a certain range, power enables load modulation to be performed within any predefined power range, as indicated by Equation 1 below:

$$P_{reg}=I_{reg} \times V_{reg} \qquad \text{Eq. 1}$$

In Eq. 1, Preg is the regulated power, Ireg is the regulated current supplied from the power switch 118, and Vreg is the regulated voltage supplied from the battery charger IC 114. In other words, since Vrect may vary, having predefined voltages and predefined currents supplied to the power switch 118, load modulation may occur within a limited range. Further, in some cases, the range of 0.5 W to 1.1. W may be implemented at the Vrect node and energy transfer efficiency of the battery charger IC 114 may be accounted for to draw proper power levels.

Figure 3:
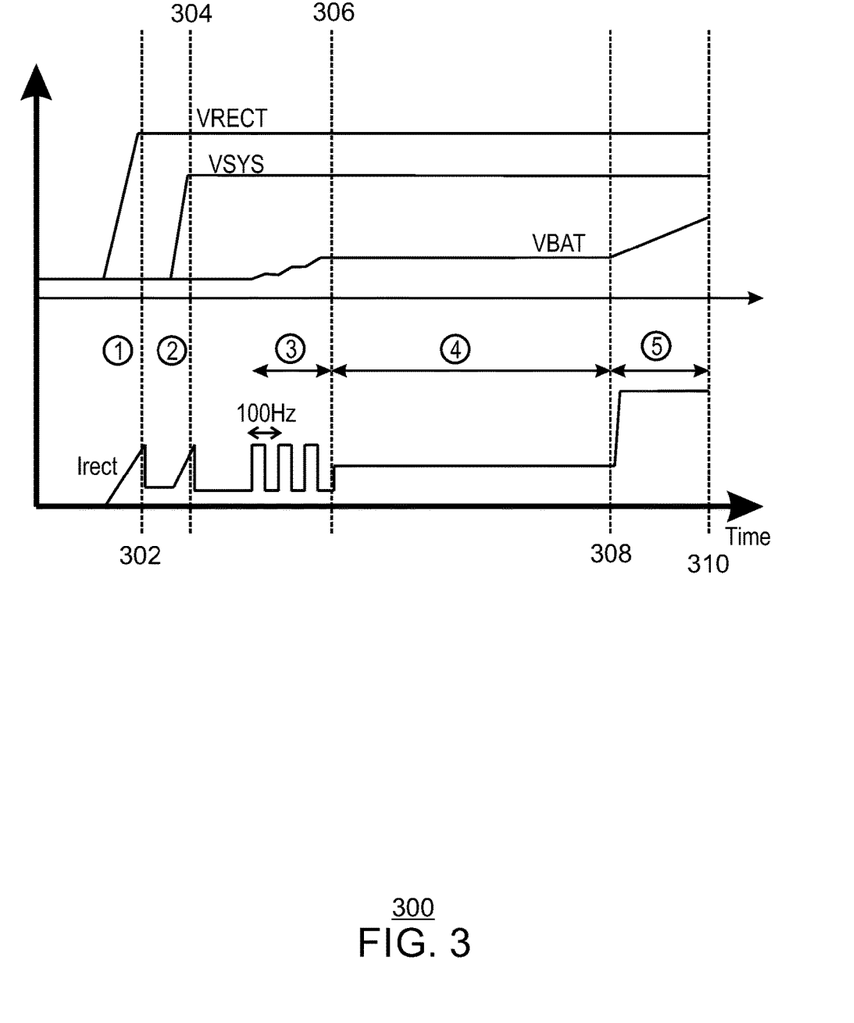
FIG. 3 is a graph illustrating changes in voltage and current in phases.

FIG. 3 is a graph illustrating changes in voltage and current in phases. As discussed above in regard to FIG. 1, load modulation may occur during initialization phases. Initialization phases may occur in some cases when a device under charge has a low battery, a fully discharged battery, when the device under charge has been turned off, and the like. The initialization phases may be used to extend a period of time associated with completing a wireless handshake, as discussed above. Extension of the time period may be especially useful when a battery, such as the battery 116 of FIG. 1 and FIG. 2 is below a threshold, or otherwise does not have enough power to initiate the wireless handshake, for example.

A first phase indicated from the left to the right and ending at the dashed line 302, Vrect and rectified current (Irect) may rise when a device to be charged is placed on a power mat having a PTU, such as the PTU 102 of FIG. 1. In a second phase indicated between the dashed line 302 and the dashed line 304, Vrect and Irect stabilize as the PMIC 204 and the charger IC 114 of FIG. 1 and FIG. 2 turns on. In some cases when the battery 116 is dead or discharged below a certain level, the battery charger IC 114 may initialize first before the PMIC 204 to provide power to the PMIC 204. In a third phase indicated between dashed line 304 and dashed line 306, the PMIC 204 may direct a battery IC, such as battery IC 114, to initiate and toggle a switch by turning on and off a power switch, such as the power switch 118 of FIG. 1 and FIG. 2. In some cases, the toggling in phase 3 may occur with a 100 Hertz frequency. In some cases, the battery charger IC 114 may be configured to sense when the PTU 102 is plugged in and complete this load modulation via power switch 118 toggling on its own. When the power switch 118 is on, Ireg flows to the PMIC 204 and to the battery 116, and Irect rises up and VBAT rises as well. When the power switch 118 is off, the currently may only flow to the PMIC 204 and Prect may be below a nominal system load, such as 200 milliwatt (mW). In some cases, the PMIC 204 and battery charger IC 114 may be the only components on (other than upstream components such as a rectifier, a DC2DC converter, and the like), thereby enabling known voltage, and therefore limited power range, to be used rather than more variable voltage that may exist if other components are initialized.

In a fourth phase indicated between the dashed line 306 and 308, a wireless data transmission device, such as the BLE module 126 may be initiated. During phase four, the PRU 104 registers with the PTU 102 via the BLE wireless handshake, and the PTU 102 may give permission to the device under charge to conduct more power. In a fifth phase indicated between dashed line 308 and continuing at least to the dashed line 310, the PMIC 204 may configure the battery charger IC 114 to disable any limitation on current, and may open the power switch 118 to charge the battery, and VBAT begins to climb as indicated in FIG. 3.

Figure 4:
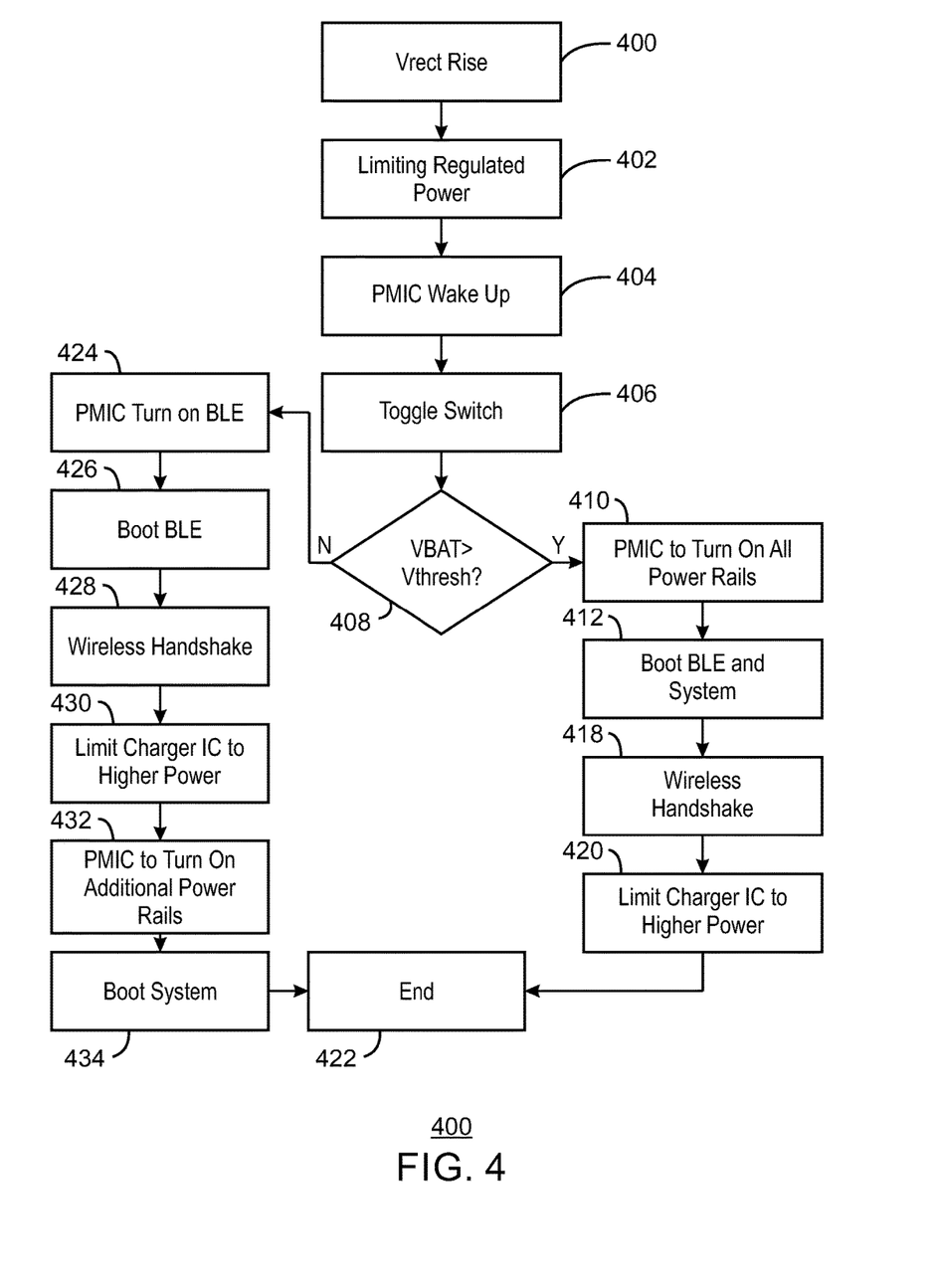
FIG. 4 is a flow chart illustrating power regulation during load modulation.

FIG. 4 is a flow chart illustrating power regulation during load modulation. At block 400 Vrect rises as a device under charge having a PRU, such as the PRU 104 is placed on or near a charger having a PTU such as the PTU 102. The charger IC limits power to a predefined threshold at block 404. The limiting of power at 402 may enable load modulations to be performed within a predefined power range, such as a predefined power range associated with a beacon extension request for wireless handshake operations. At block 404, a PMIC, such as the PMIC 204 of FIG. 2 is woken up. At block 406, a power switch, such as the power switch 112 of FIG. 1 and FIG. 2 is toggled to perform load modulation signaling associated with a beacon extension request. At block 408, VBAT is compared to a voltage threshold (Vthresh). If the VBAT is greater than Vthresh, then the PMIC 204 may turn on all power rails associated with PRU 102 components at block 410, and boot the BLE module 126 and the system at block 412. Booting both the BLE module 126 as well as the system at block 412 may initiate the wireless handshake at 414, and the power limited at 402 may be raised to a higher power limit associated with normal power consumption at block 420 and the process 400 may end at 422. However, if VBAT is not greater than the Vthresh at 408, then the PMIC will not turn on power all power rails. Instead, the PMIC 204 may turn on only rails associated with the BLE module 126, as indicated at block 424. At block 426, the BLE module 126 may be booted, and a wireless handshake may occur at block 428. At block 430, the power limited at 402 may be raised to a higher power limit associated with power rails other than the BLE module 126, and the PMIC may turn on additional power rails at 432, and boot the system at 434.

Figure 5:
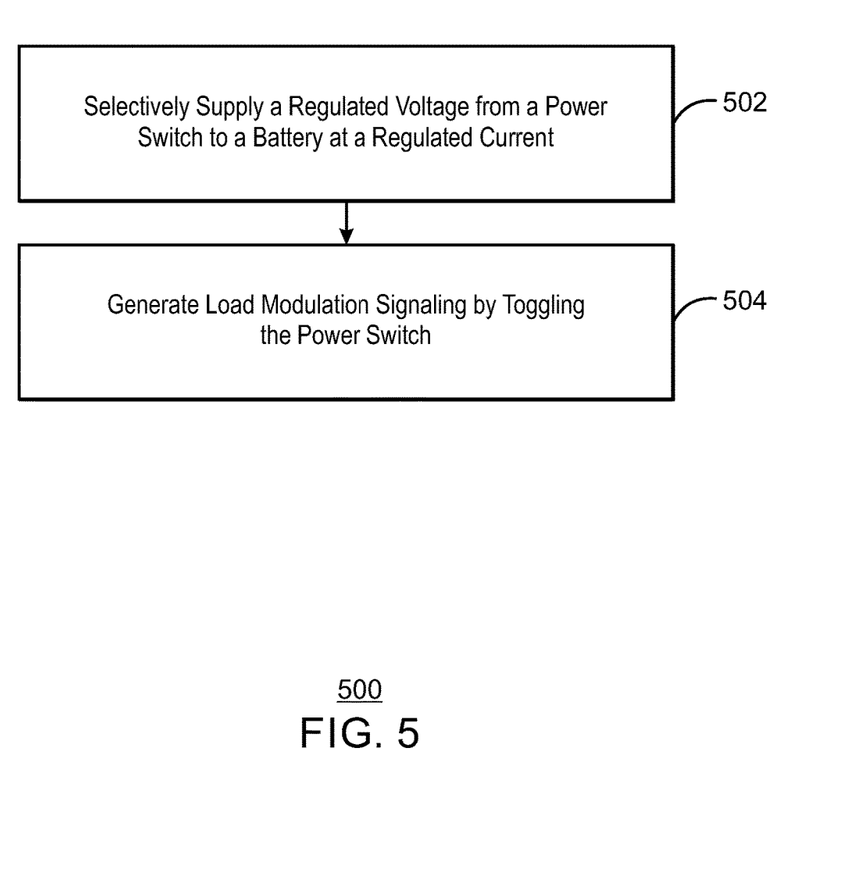
FIG. 5 is a block diagram illustrating a method for reducing power variation in a wireless charging apparatus.

FIG. 5 is a block diagram illustrating a method for reducing power variation in a wireless charging apparatus. At 502, the method 500 includes selectively supplying a regulated voltage from a power switch to a battery at a regulated current, and at block 504, the method 500 includes generating load modulation signaling by toggling the power switch.

In some cases, the regulated voltage is predefined based on characteristics of the battery. However, the regulated voltage may be predefined based on characteristics of a specification guideline, such as the A4WP standard indicating a power range for load modulations during a long beacon extension request. Generating the load modulation signaling is performed by a component of a battery charger circuit in some cases. Further, in some cases, energy in a backup battery circuit may be used to perform load modulation. A backup battery may be a relatively smaller battery than the battery 116 of FIG. 1 and may be configured to retain clock signals when the battery 116 is not available, discharged, or below a certain threshold. The battery charger circuit may include a backup battery charger IC configured to regulate power supplied to the backup battery in the backup battery circuit. Generating the load modulation signaling is performed by logic a component of a PMIC in some cases. In yet other cases, generating the load modulation signaling is performed by any combination of components of a PRU.

The method 500 may include receiving rectified voltage and generating the regulated voltage via the battery charger circuit. Further, as discussed above, generating load modulation signaling at 504 comprises issuing a beacon extension request. In this scenario, the beacon extension request extends a time period to complete a wireless handshake between the wireless power receiver and a wireless power transmitter inductively coupled to the wireless power receiver.

The method 500 may also include detecting a power level available in the battery. In this case, the method 500 may include initiating only power rails associated with wireless handshake components if the available power level in the battery is below a predefined threshold. Further, the method 500 may further include initiating power rails for a system boot if the available power level in the battery is above the predefined threshold.

In some scenarios, the method 500 may include generating the load modulation signaling within a predefined power range. In some cases, the load modulation occurs during initialization phase of a computing device, as discussed above in regard to FIG. 1 and FIG. 3.

Example 1 is an apparatus for power regulation in a wireless power receiver. In this example, the wireless charging device may include a power switch to selectively supply a regulated voltage to a battery at a regulated current, and a load modulation logic to generate load modulation signaling by toggling the power switch.

Example 2 includes the apparatus of example 1. In this example, regulated voltage is predefined based on characteristics of the battery.

Example 3 includes the apparatus of any combination of examples 1-2. In this example, load modulation logic is a component of a battery charger circuit.

Example 4 includes the apparatus of any combination of examples 1-3. In this example, battery charger circuit is configured to receive rectified voltage and generate the regulated voltage.

Example 5 includes the apparatus of any combination of examples 1-4. In this example, load modulation signaling may include a beacon extension request.

Example 6 includes the apparatus of any combination of examples 1-5. In this example, beacon extension request extends a time period to complete a wireless handshake between the wireless power receiver and a wireless power transmitter inductively coupled to the wireless power receiver.

Example 7 includes the apparatus of any combination of examples 1-6. In this example, load modulation logic is to: detect a power level available in the battery, and initiate only power rails associated with wireless handshake components if the available power level in the battery is below a predefined threshold.

Example 8 includes the apparatus of any combination of examples 1-7. In this example, load modulation logic is to initiate power rails for a system boot if the available power level in the battery is above the predefined threshold.

Example 9 includes the apparatus of any combination of examples 1-8. In this example, load modulation logic is to generate the load modulation signaling within a predefined power range.

Example 10 includes the apparatus of any combination of examples 1-9. In this example, apparatus is a component of a computing device, and wherein the load modulation occurs during initialization phase of the computing device.

Example 11 is a method for power regulation in a wireless power receiver. In this example, wireless charging device may include selectively supplying a regulated voltage from a power switch to a battery at a regulated current, and generating load modulation signaling by toggling the power switch.

Example 12 includes the method of example 11. In this example, regulated voltage is predefined based on characteristics of the battery.

Example 13 includes the method of any combination of examples 11-12. In this example, generating the load modulation signaling is performed by a component of a battery charger circuit.

Example 14 includes the method of any combination of examples 11-13. This example includes receiving rectified voltage and generating the regulated voltage via the battery charger circuit.

Example 15 includes the method of any combination of examples 11-14. In this example generating load modulation signaling may include issuing a beacon extension request.

Example 16 includes the method of any combination of examples 11-15. In this example issuing the beacon extension request generates a time period extension to complete a wireless handshake between the wireless power receiver and a wireless power transmitter inductively coupled to the wireless power receiver.

Example 17 includes the method of any combination of examples 11-16. This example includes detecting a power level available in the battery, and initiating only power rails associated with wireless handshake components if the available power level in the battery is below a predefined threshold.

Example 18 includes the method of any combination of examples 11-17. This example includes initiating power rails for a system boot if the available power level in the battery is above the predefined threshold.

Example 19 includes the method of any combination of examples 11-18. This example includes generating the load modulation signaling within a predefined power range.

Example 20 includes the method of any combination of examples 11-19. In this example, load modulation occurs during initialization phase of a computing device.

Example 21 is a system for power regulation in a wireless power receiver. In this example, wireless charging device may include a battery charger circuit to receive a rectified voltage and generate a regulated voltage, a power switch to selectively supply the regulated voltage to a battery at a regulated current, and a load modulation logic to generate load modulation signaling by toggling the power switch.

Example 22 includes the system of example 21. In this example, regulated voltage is predefined based on characteristics of the battery.

Example 23 includes the system of any combination of examples 21-22. In this example, load modulation logic is a component of the battery charger circuit.

Example 24 includes the system of any combination of examples 21-23. In this example, rectified current is unregulated prior to being provided to the battery charger circuit.

Example 25 includes the system of any combination of examples 21-24. In this example, load modulation signaling may include a beacon extension request.

Example 26 includes the system of any combination of examples 21-25. In this example, beacon extension request extends a time period to complete a wireless handshake between the wireless power receiver and a wireless power transmitter inductively coupled to the wireless power receiver.

Example 27 includes the system of any combination of examples 21-26. In this example, load modulation logic is to: detect a power level available in the battery, and initiate only power rails associated with wireless handshake components if the available power level in the battery is below a predefined threshold.

Example 28 includes the system of any combination of examples 21-27. In this example, load modulation logic is to initiate power rails for a system boot if the available power level in the battery is above the predefined threshold.

Example 29 includes the system of any combination of examples 21-28. In this example, load modulation logic is to generate the load modulation signaling within a predefined power range.

Example 30 includes the system of any combination of examples 21-29. In this example, system is a component of a computing device, and wherein the load modulation occurs during initialization phase of the computing device.

Example 31 is an apparatus for power regulation in a wireless power receiver. In this example, wireless charging device may include a power switch to selectively supply a regulated voltage to a battery at a regulated current, and a means to generate load modulation signaling by toggling the power switch.

Example 32 includes the apparatus of example 31. In this example, regulated voltage is predefined based on characteristics of the battery.

Example 33 includes the apparatus of any combination of examples 31-32. In this example, means to generate load modulation signaling is a component of a battery charger circuit.

Example 34 includes the apparatus of any combination of examples 31-33. In this example, battery charger circuit is configured to receive rectified voltage and generate the regulated voltage.

Example 35 includes the apparatus of any combination of examples 31-34. In this example, load modulation signaling may include a beacon extension request.

Example 36 includes the apparatus of any combination of examples 31-35. In this example, beacon extension request extends a time period to complete a wireless handshake between the wireless power receiver and a wireless power transmitter inductively coupled to the wireless power receiver.

Example 37 includes the apparatus of any combination of examples 31-36. In this example, means to generate load modulation signaling is to: detect a power level available in the battery, and initiate only power rails associated with wireless handshake components if the available power level in the battery is below a predefined threshold.

Example 38 includes the apparatus of any combination of examples 31-37. In this example, means to generate load modulation signaling is to initiate power rails for a system boot if the available power level in the battery is above the predefined threshold.

Example 39 includes the apparatus of any combination of examples 31-38. In this example, means to generate load modulation signaling is to generate the load modulation signaling within a predefined power range.

Example 40 includes the apparatus of any combination of examples 31-39. In this example, apparatus is a component of a computing device, and wherein the load modulation occurs during initialization phase of the computing device.

Example 41 is a system for power regulation in a wireless power receiver. In this example, wireless charging device may include a battery charger circuit to receive a rectified voltage and generate a regulated voltage, a power switch to selectively supply the regulated voltage to a battery at a regulated current, and a means to generate load modulation signaling by toggling the power switch.

Example 42 includes the system of example 41. In this example, regulated voltage is predefined based on characteristics of the battery.

Example 43 includes the system of any combination of examples 41-42. In this example, means to generate load modulation signaling is a component of the battery charger circuit.

Example 44 includes the system of any combination of examples 41-43. In this example, rectified current is unregulated prior to being provided to the battery charger circuit.

Example 45 includes the system of any combination of examples 41-44. In this example, load modulation signaling may include a beacon extension request.

Example 46 includes the system of any combination of examples 41-45. In this example, beacon extension request extends a time period to complete a wireless handshake between the wireless power receiver and a wireless power transmitter inductively coupled to the wireless power receiver.

Example 47 includes the system of any combination of examples 41-46. In this example, means to generate load modulation signaling is to: detect a power level available in the battery, and initiate only power rails associated with wireless handshake components if the available power level in the battery is below a predefined threshold.

Example 48 includes the system of any combination of examples 41-47. In this example, means to generate load modulation signaling is to initiate power rails for a system boot if the available power level in the battery is above the predefined threshold.

Example 49 includes the system of any combination of examples 41-48. In this example, means to generate load modulation signaling is to generate the load modulation signaling within a predefined power range.

Example 50 includes the system of any combination of examples 41-49. In this example, system is a component of a computing device, and wherein the load modulation occurs during initialization phase of the computing device.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for power regulation in a wireless power receiver, comprising:
   a wireless power receiving coil to receive wireless power from a power transmitting unit;
   circuitry coupled to the wireless power receiving coil to transform an AC voltage received at the wireless power receiving coil to a regulated DC voltage;
   a power switch that couples the regulated DC voltage to a battery, wherein the power switch is configured to selectively supply the regulated DC voltage to the battery at a regulated current; and
   a load modulation logic configured to modulate the load on the wireless power receiving coil by toggling the power switch to couple the regulated DC voltage to the battery according to a load modulation signaling pattern to be detected by the power transmitting unit.

2. The apparatus of claim 1, wherein the regulated DC voltage is a predefined voltage based on at least one characteristic of the battery.

3. The apparatus of claim 1, wherein the load modulation logic is a component of a charger circuit of the battery.

4. The apparatus of claim 3, wherein the charger circuit of the battery is configured to receive rectified voltage and generate the regulated DC voltage.

5. The apparatus of claim 1, wherein the load modulation signaling comprises a beacon extension request.

6. The apparatus of claim 5, wherein the beacon extension request extends a time period to complete a wireless handshake between the wireless power receiver and a wireless power transmitter inductively coupled to the wireless power receiver.

7. The apparatus of claim 1, wherein the load modulation logic is configured to:
   detect a power level available in the battery; and
   initiate only power rail that is associated with a wireless handshake component if the power level available in the battery is below a predefined threshold.

8. The apparatus of claim 7, wherein the load modulation logic is configured to initiate power rail for a system boot if the power level available in the battery is above the predefined threshold.

9. The apparatus of claim 1, wherein the load modulation logic is configured to modulate the load on the wireless power receiving coil within a predefined power range.

10. The apparatus of claim 1, wherein the apparatus is a component of a computing device, and wherein the load modulation occurs during an initialization phase of the computing device.

11. A method for power regulation in a wireless power receiver, comprising:
   receive wireless power from a power transmitting unit at a wireless power receiving coil;
   transform an AC voltage received at the wireless power receiving coil to a regulated DC voltage; and
   modulating the load on the wireless power receiving coil by toggling a power switch that couples the regulated DC voltage to a battery, wherein the toggling generates a load modulation signal to be received by the power transmitting unit.

12. The method of claim 11, wherein the regulated DC voltage is predefined based on at least one characteristic of the battery.

13. The method of claim 11, wherein the toggling the power switch is performed by a component of a battery charger circuit.

14. The method of claim 13, further comprising receiving rectified voltage and generating the regulated DC voltage via a charger circuit of the battery.

15. The method of claim 11, wherein generating load modulation signaling comprises issuing a beacon extension request.

16. The method of claim 15, wherein issuing the beacon extension request comprises generating a time period extension to complete a wireless handshake between the wireless power receiver and a wireless power transmitter inductively coupled to the wireless power receiver.

17. The method of claim 11, further comprising:
   detecting a power level available in the battery; and
   initiating only power rail associated with a wireless handshake component if the power level available in the battery is below a predefined threshold.

18. The method of claim 17, further comprising initiating power rail for a system boot if the power level available in the battery is above the predefined threshold.

19. The method of claim 11, further comprising generating the load modulation signaling within a predefined power range.

20. The method of claim 11, wherein the load modulation occurs during an initialization phase of a computing device.

21. A system for power regulation in a wireless power receiver, comprising:
   a wireless power receiving coil to receive wireless power from a power transmitting unit;
   a battery charger circuit to receive a rectified voltage from the wireless power receiving coil and generate a regulated voltage;
   a power switch to selectively supply the regulated voltage to a battery at a regulated current; and
   a load modulation logic to modulate the load on the wireless power receiving coil by toggling the power switch to couple the regulated voltage to the battery according to a load modulation signaling pattern to be detected by the power transmitting unit.

22. The system of claim 21, wherein the load modulation generates a beacon extension request.

23. The system of claim 22, wherein the beacon extension request extends a time period to complete a wireless handshake between the wireless power receiver and a wireless power transmitter inductively coupled to the wireless power receiver.

24. The system of claim 21, wherein the load modulation logic is to:
   detect a power level available in the battery;
   initiate only power rail associated with a wireless handshake component if the power level available in the battery is below a predefined threshold; and
   initiate power rail for a system boot if the power level available in the battery is above the predefined threshold.

25. The system of claim 21, wherein the load modulation modulates the load on the wireless power receiving coil within a predefined power range.

* * * * *